United States Patent
Penner et al.

(10) Patent No.: US 7,204,515 B2
(45) Date of Patent: Apr. 17, 2007

(54) OCCUPANT RESTRAINT MECHANISM

(75) Inventors: Ben Penner, Ann Arbor, MI (US); Takao Sato, Canton, MI (US); Jesse Buehler, Ypsilanti, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 296 days.

(21) Appl. No.: 10/796,216

(22) Filed: Mar. 9, 2004

(65) Prior Publication Data

US 2005/0200109 A1 Sep. 15, 2005

(51) Int. Cl.
*B60R 21/045* (2006.01)

(52) U.S. Cl. .................. 280/752; 280/748; 296/187.05; 296/70; 188/377

(58) Field of Classification Search ............... 280/751, 280/752, 748, 753; 296/187.05, 70; 188/377; 180/90
See application file for complete search history.

(56) References Cited

U.S. PATENT DOCUMENTS

| 4,417,750 | A |   | 11/1983 | Burry .................. 280/753 |
| 5,037,130 | A | * | 8/1991 | Okuyama .................. 280/752 |
| 5,456,494 | A | * | 10/1995 | Witkovsky .................. 280/752 |
| 5,577,770 | A | * | 11/1996 | Sinner et al. ............... 280/752 |
| 5,927,755 | A | * | 7/1999 | Matsuo et al. .............. 280/752 |
| 6,299,208 | B1 | * | 10/2001 | Kasahara et al. ........... 280/752 |
| 6,883,833 | B2 | * | 4/2005 | Yamazaki et al. .......... 280/751 |

FOREIGN PATENT DOCUMENTS

| DE | 196 10 282 A | * | 8/1996 |
| JP | 07-205734 |  | 8/1995 |
| JP | 11-321501 |  | 11/1999 |

* cited by examiner

*Primary Examiner*—Ruth Ilan
(74) *Attorney, Agent, or Firm*—Gifford, Krass, Sprinkle, Anderson & Citkowski, P.C.

(57) ABSTRACT

An occupant restraint mechanism is disposed between a rigid member and an instrument panel of an automotive vehicle. The occupant restraint mechanism includes first and second brackets each extending between proximal ends fixedly secured to the rigid member and distal ends coupled to the instrument panel. One of the first and second brackets has at least one notch formed therein. The notch has a predetermined size to allow a predetermined amount of deformation of the first and second brackets during contact of an occupant with the instrument panel during a sudden deceleration of the vehicle.

3 Claims, 2 Drawing Sheets

OCCUPANT RESTRAINT MECHANISM

BACKGROUND OF THE INVENTION

1. Field of the Invention

The invention relates to an occupant restraint mechanism in an automotive vehicle. More particularly, the invention relates to a pair of brackets that minimizes loading upon and intrusion by an occupant's legs through an instrument panel during a sudden deceleration of the vehicle.

2. Description of the Related Art

It is known to provide a single bracket behind an instrument panel in an automotive vehicle to minimize intrusion of an occupant's knees through the instrument panel during a sudden deceleration of the vehicle. The same bracket is, however, also expected to minimize loads experienced at the femurs of the occupant. Typically, the bracket deforms to cushion the contact between the occupant's legs and the instrument panel, thereby minimizing the peak load felt at the femurs. It remains desirable to minimize the peak femur loads when the occupant's legs contact the instrument panel during a sudden deceleration of the vehicle and, at the same time, minimize intrusion of the occupant's knees through the instrument panel.

SUMMARY OF THE INVENTION

According to one aspect of the invention, an occupant restraint mechanism disposed between a rigid member and an instrument panel of an automotive vehicle is provided. The occupant restraint mechanism includes first and second brackets each extending between proximal ends fixedly secured to the rigid member and distal ends coupled to the instrument panel. One of the first and second brackets has at least one notch formed therein. The notch has a predetermined size to allow a predetermined amount of deformation of the first and second brackets during contact of an occupant with the instrument panel during a sudden deceleration of the vehicle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
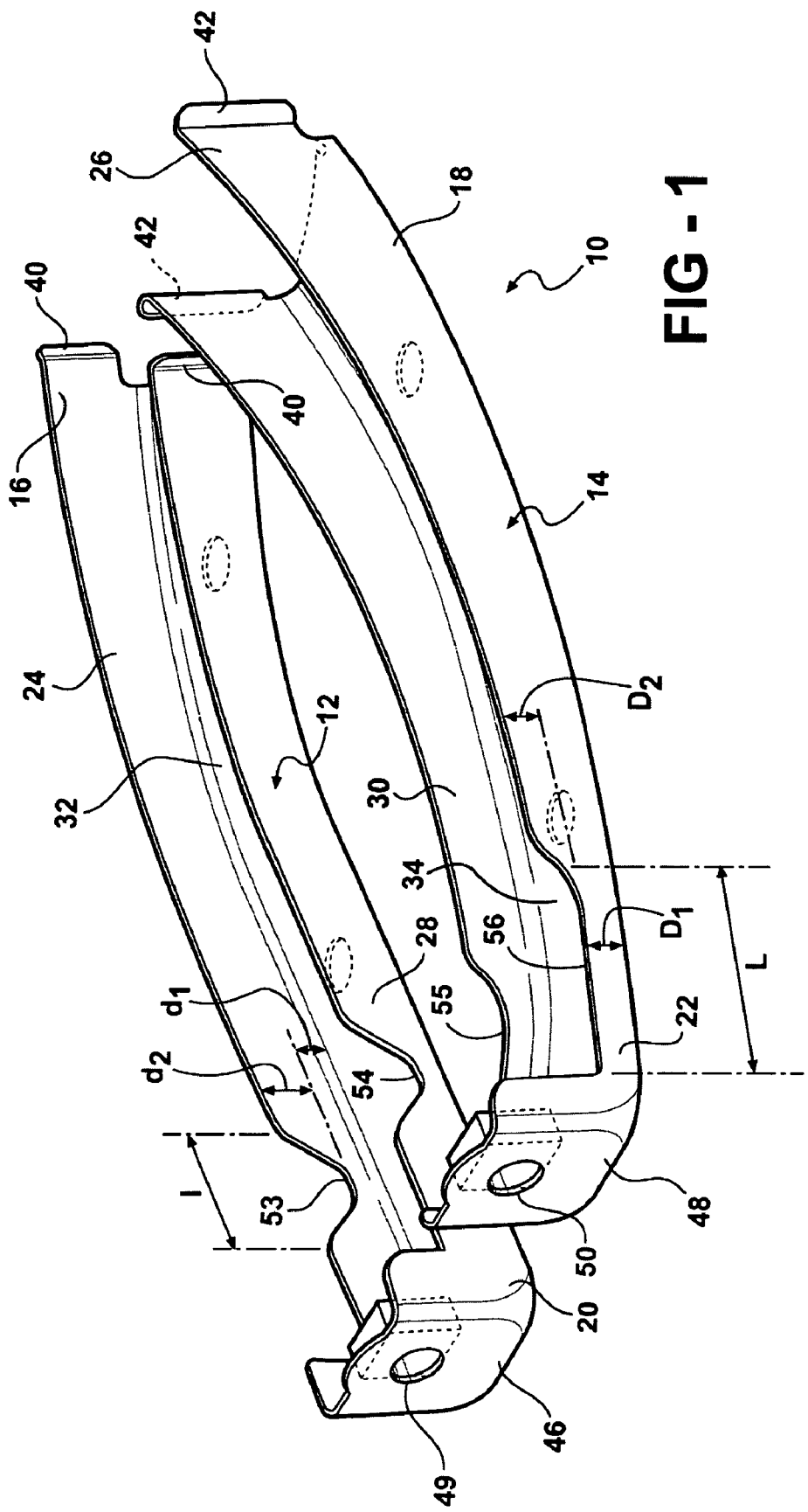
FIG. 1 is a perspective view of an occupant restraint mechanism according to the invention.
Figure 2:
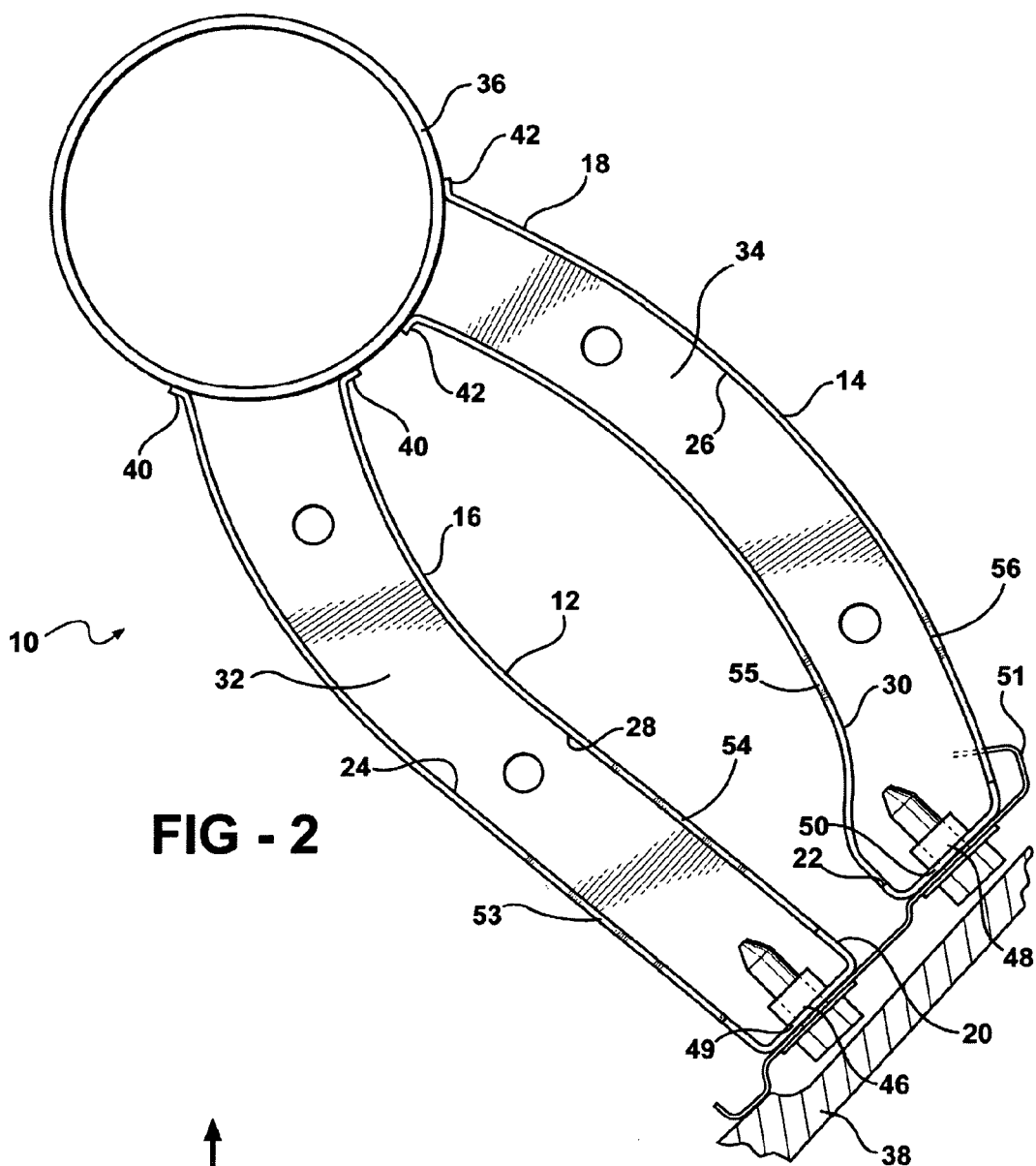
FIG. 2 is a side elevational view of the occupant restraint mechanism.

Referring to FIGS. 1 and 2, an occupant restraint mechanism for an automotive vehicle according to the invention is generally indicated at 10. The occupant restraint mechanism 10 includes a pair of brackets 12, 14, which are preferably formed from stamped steel having a thickness ranging typically between 1.0 mm and 1.2 mm. Each of the pair of brackets 12, 14 extends between a proximal end 16, 18 and a distal end 20, 22. Preferably, the pair of brackets 12, 14 extends longitudinally between the proximal 16, 18 and distal 20, 22 ends along arcuate paths. Each of the pair of brackets 12, 14 includes spaced apart outer 24, 26 and inner 28, 30 walls. A web 32, 34 extends between the outer 24, 26 and inner 28, 30 walls defining an open, generally U-shaped cross section. Alternatively, a second web spaced apart and generally parallel to the web 32, 34 can extend between the outer 24, 26 and inner 28, 30 walls to define a closed, generally rectangular cross section.

Each proximal end 16, 18 is fixedly secured to a rigid member 36, which is fixedly supported behind an instrument panel 38 or knee bolster 38 in the vehicle. More specifically, a flange 40, 42 is formed at each proximal end 16, 18 that allows the pair of brackets 12, 14 to be secured to the rigid member 36 by any conventional methods, such as welding, bolting, adhesives or the like. The pair of brackets 12, 14 extends generally radially outwardly in a V-shaped manner from the rigid member 36 toward the knee bolster 38. Each distal end 20, 22 is fixedly secured to the knee bolster 38. More specifically, an end wall 46, 48 defines each distal end 20, 22 and extends between the outer walls 24, 26, inner walls 28, 30 and the web 32, 34. An aperture 49, 50 is formed in each end wall 46, 48 to receive a bolt or other similar fastener. Preferably, the distal ends 20, 22 of the pair of brackets 12, 14 are fixedly secured to a common plate 51. The plate 51, in turn, is fixedly secured to the knee bolster 38 by any suitable methods, such as by adhesives or molded in-place during formation of the knee bolster 38.

A notch 53, 54 is formed along an open edge of each of the outer 24 and inner 28 walls of one of the pair of brackets, now referred to as a lower bracket 12. Each notch 53, 54 is generally V-shaped defining a opening length l. The opening length l is the width of each notch 53, 54 at its widest point. Additionally, each notch 53, 54 extends in a concave manner toward the web 32 defining wall depths $d_1$ and $d_2$. The wall depth $d_1$ is the distance between the low point of each notch 53, 54 and the web 32. The wall depth $d_2$ is the distance between the open edge of each of the outer 24 and inner walls 28 and the bottom of the respective notch 53, 54.

Similarly, a cutout 55, 56 is formed along an opened edge of each of the outer 26 and inner 30 walls of the other of the pair of brackets, now referred to as an upper bracket 14. Each cutout 55, 56 is generally U-shaped defining a length L. The length L is the length of the bottom of each cutout 55, 56. Each cutout 55, 56 extends in a concave manner toward the web 34 defining wall depths $D_1$ and $D_2$. The wall depth $D_1$ is the distance between the bottom of the cutout 55, 56 and the web 34. The wall depth $D_2$ is the distance between the open edges of the outer 26 and inner walls 30 and the bottom of the respective cutouts 55, 56.

In use, each of the pair of brackets 12, 14 are oriented longitudinally fore and aft between the rigid member 36 and the knee bolster 38. The upper bracket 14 is positioned in the vicinity of the knees of the occupant. The lower bracket 12 is positioned below the upper bracket 14. Both the upper 14 and lower 12 brackets minimize intrusion of the knees through the knee bolster 38 during a sudden deceleration of the vehicle. In general, the chosen size, shape and position of the notches 53, 54 and cutouts 55, 56 depend on such factors as the particular type of vehicle into which the brackets 12, 14 are installed, the specified peak femur load requirements, and type and thickness of material used for the brackets 12, 14. The size and position of the notches 53, 54 and cutouts 55, 56 along the brackets 12, 14 can be modified to affect the amount and direction of deformation of the brackets 12, 14 and, thereby, control the amount of femur loading and when the peak loading occurs with respect to the deceleration event.

Figure 3:
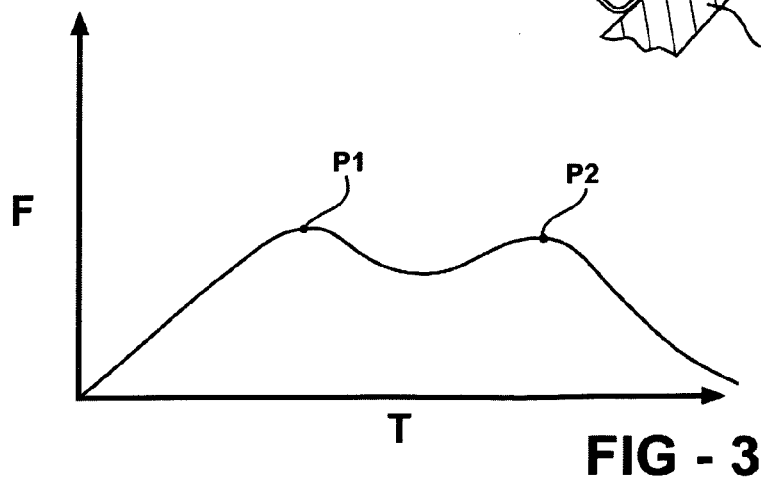
FIG. 3 is a graph of femur loads versus time elapsed during a deceleration event.

In FIG. 3, a graph is shown of femur loads versus time elapsed during the deceleration event. Both the lower 12 and upper 14 brackets immediately begin absorbing energy during the deceleration event to minimize intrusion of the knees through the knee bolster 38. Preferably, the lower 12 and upper 14 brackets yield in a generally successive manner during the deceleration event, in order to reduce the peak femur loading. The solid line in the graph illustrates one such mode. Initially, the femur loads increase as both the lower 12 and upper 14 brackets resist displacement of the instrument panel. Eventually, the lower bracket 12 yields before the upper bracket 14, resulting in a first peak femur load indicated as P1. After the first peak P1, the femur loads dip as the lower bracket 12 and the knee bolster 38 are displaced under loading. The upper bracket 14 then begins to resist further displacement, which results in a second increase in femur loads. As the femur loads approach the levels of the first peak P1, the upper bracket 14 yields resulting in a second peak femur load P2.

In general, the dimensions of the lower 12 and upper brackets 14 are tuned to maximize energy absorption, while at the same time avoiding excess femur loading. More specifically, the dimensions of the notches 53, 54 and cutouts 55, 56 are predetermined to control the first P1 and second P2 peak levels and when they occur with respect to each other. Increasing or decreasing the length L of the cutouts 55, 56, for example, increases or decreases the time when the second peak P2 occurs after the first peak P1. Further, the first P1 and second P2 peak levels can be controlled by making corresponding changes to the wall depths $d_2$, $D_2$ of the lower 12 and upper 14 brackets, respectively.

A specific example of a lower and upper brackets is now described, wherein the lower and upper brackets are formed from stamped steel having a thickness of 1.2 mm. The dimensions of the notches and the cutouts are summarized in a table below and are based on results from a generic unbelted 25 mph crash test conducted with a 5th percentile female anthropomorphic test specimen.

|  | Reference Numeral | Dimension (mm) |
|---|---|---|
| Notches | 1 | 18.6 |
|  | $d_1$ | 3 |
|  | $d_2$ | 7 |
| Cutouts | L | 25.5 |
|  | $D_1$ | 5 |
|  | $D_2$ | 5 |

Lower and upper brackets having notches and cutouts with these dimensions having been shown to achieve the goal of maximizing energy absorption, while at the same time avoiding excess femur loading by allowing the lower and upper brackets to yield sequentially. In this example, the upper bracket yielded 20 ms after the lower bracket, resulting in peak femur loads of 3.5 kN for P1 and 3.0 kN for P2.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. An occupant restraint mechanism disposed between a rigid member and an instrument panel of an automotive vehicle, said occupant restraint mechanism comprising:
   first and second brackets having spaced apart side walls, each of said first and second brackets including a web that extends between said side walls to define a generally U-shaped cross section, each of said side walls extending between an open edge and said web, each of said first and second brackets extending arcuately between opposite proximal and distal ends, said proximal end having a flange to allow said first and second brackets to be welded to the rigid member, said distal end having an end wall extending between said side walls, each end wall having an aperture formed therein to allow said distal ends of said first and second brackets to be fixedly secured to the instrument panel;
   one of said first and second brackets having at least one notch formed therein, said notch having a predetermined size to allow a predetermined amount of deformation of said first and second brackets during contact of an occupant with the instrument panel during a sudden deceleration of the vehicle, said notch being formed in at least one of said aide walls of said one of said first and second brackets, said notch being formed along said open edge and extending in a concave manner toward said web;
   one of said pair of brackets being positioned in the vicinity of the occupant's knees to minimize intrusion of the knees through the instrument panel;
   one of said pair of brackets being disposed below the other such that the pair of brackets deform in a successive manner to minimize during contact between the occupant's knees and the instrument panel during sudden deceleration of the vehicle, thereby minimizing loading of the occupant's femurs.

2. An occupant restraint mechanism as set forth in claim 1, wherein said side walls are generally parallel.

3. An occupant restraint mechanism as set forth in claim 1, wherein said notch extends through a portion of said at least one of said side walls of said one of said first and second brackets.

* * * * *

UNITED STATES PATENT AND TRADEMARK OFFICE
CERTIFICATE OF CORRECTION

| | | |
|---|---|---|
| PATENT NO. | : 7,204,515 B2 | Page 1 of 1 |
| APPLICATION NO. | : 10/796216 | |
| DATED | : April 17, 2007 | |
| INVENTOR(S) | : Benjamin W. Penner et al. | |

It is certified that error appears in the above-identified patent and that said Letters Patent is hereby corrected as shown below:

Column 4, line 34, replace "aide" with --side--

Signed and Sealed this

Seventh Day of August, 2007

JON W. DUDAS
*Director of the United States Patent and Trademark Office*